Eugene C. MacMullan INVENTOR

BY Robert J. Pearlman
PATENT ATTORNEY

3,282,799
FRACTIONATOR CONTROL SYSTEM USING AN ANALOG COMPUTER
Eugene C. MacMullan, Wharton, N.J., assignor to Esso Research and Engineering Company, a corporation of Delaware
Filed Feb. 16, 1962, Ser. No. 173,627
4 Claims. (Cl. 203—2)

The present invention is concerned with a method and apparatus for continuously monitoring the feed stream to a fractionator to obtain a substantially constant quality product. More specifically, the present invention is concerned with an improved method and apparatus whereby an analog computer is utilized to continuously determine and adjust the overhead product-bottoms product split in a fractionating column.

In its most specific aspect, the present invention is concerned with a method and apparatus whereby the quantity of the feed components which are to be taken overhead are continuously monitored to adjust the overhead product rate from the fractionator, thereby obtaining an overhead product of substantially constant quality.

There are numerous fractionator control systems known to the art directed toward obtaining products of substantially constant quality. However, these control systems are subject to the limitation that changes in feed rate and/or composition affect the operating characteristics of a fractionating column. Therefore, any change in either of these variables results in a deviation from the standard product quality desired. It is thus an object of the present invention to provide a simple fractionator control system wherein there is substantially no deviation in product quality even though the composition and/or rate of the feed to the fractionator varies appreciably.

In the present invention, an analog computer is used to continuously determine the quantity of the components in the feed stream that are to be withdrawn from the fractionating column as overhead product. This determination is then used to make an adjustment in the rate of flow of overhead product. In the preferred embodiment of the present invention, the fractionating characteristics of the column are maintained substantially constant by using the flooded condenser control technique.

The flooded condenser control technique is applicable only to fractionating columns wherein the overhead vapor is completely condensed. A pressure controller, which varies the rate of flow of reflux, is used to maintain the tower pressure at a constant level.

The flooded condenser control system may be visualized as operating in this manner.

Under normal operating conditions the condenser, which totally condenses the overhead vapor stream, has a preselected portion of the condensing surface covered with liquid. As previously mentioned the rate at which reflux is returned to the upper region of the column is determined by the pressure in the column.

Thus, when the pressure increases there is an increase in the vaporization in the column. To lower the pressure and thus condense the increased vapor in the column, the rate at which reflux is returned to the column is increased. An additional effect is obtained from this increase in the rate of flow of reflux. As the reflux flow rate is increased, the liquid level in the condenser drops, exposing more condensing surface. This increased condensing surface is then available to condense a greater quantity of overhead vapor.

On the other hand, a decrease in column pressure is the result of a decrease in the quantity of vapor riding up the column. Therefore, to maintain the column pressure at a preselected level, the rate at which reflux is returned to the column is decreased. This will tend to raise the liquid level in the condenser and thus reduce the exposed condensing surface.

This control system is self correcting in that a change in tower heat balance due to an increase or decrease in either heat input or removal is automatically compensated by the appropriate change in reflux rate. Thus, the ratio of distillate to feed is unaffected by disturbances to the tower heat balance.

It should also be noted that the next effect of maintaining the column pressure at a substantially constant preselected level is to maintain a substantially constant internal reflux ratio.

The internal reflux ratio is defined as the ratio of the quantity of vapor flowing to the top stage in the column to the quantity of liquid flowing from the top stage in the column.

Thus, an increase in column pressure is the result of either increased vaporization or decrease in the quantity of reflux liquid flowing downward in the column. However, as the pressure increases the rate of flow of reflux returning to the upper region of the column is increased. This tends to increase the reflux liquid flowing downward in the column and will result in a substantially constant internal reflux ratio.

The advantages and characteristics of the flooded condenser control system are discussed in detail in application Serial No. 99,425, John F. McIntyre, Jr., inventor now abandoned.

It will be appreciated by those skilled in the art that the fractionating characteristics of a column, at a given feed rate and composition, depend on the internal reflux ratio and the number of theoretical stages.

The theoretical stages in a fractionating column is not a variable which lends itself to process control. This variable is substantially fixed in a fractionating column.

As previously pointed out, the flooded condenser control system maintains a constant internal reflux ratio in the fractionating column. Thus, if the feed rate and composition do not vary appreciably, the flooded condenser control is capable of fractionating the feed stream into the split for which the column was designed so as to maintain substantially constant product quality.

However, changes in feed rate and/or feed composition represent changes in variables for which the flooded condenser control system cannot compensate. As a result, changes in these variables bring about corresponding deviations in the quality of the product from the fractionating column.

Therefore, it is an object of the present invention to provide a control system which is used in conjunction with the flooded condenser control system and which overcomes the inherent limitations of the flooded condenser control system.

In the present invention the feed stream is continuously analyzed to obtain a composition of the feed stream. Also, a conventional flow recorder is used to obtain the feed rate to the column. These data are then in turn continuously analyzed by an analog computer to obtain the quantity of the product that should be taken overhead from the fractionating column consistent with the fractionating characteristics of the column. The analog computer is used to reset the rate of flow controller in the overhead product line to the desired rate. In this manner the limitations of the flooded condenser control system are overcome.

This and other advantages of the present invention will become apparent when viewed in light of the accompanying drawings.

Figure 1:
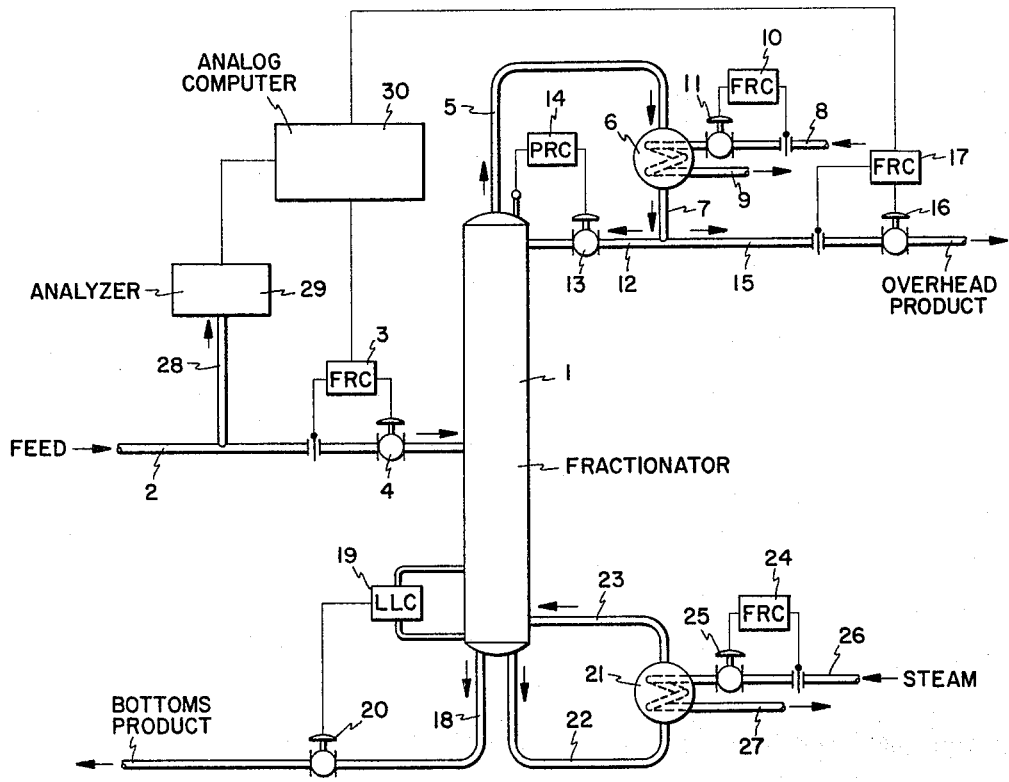
FIGURE 1 is a schematic representation of a fractionating column with the control system of the present invention.

Referring now to FIGURE 1, numeral 1 represents a fractionating column. This column utilizes any conventional liquid-vapor contacting devices known to the art. Examples of these are any fractionating trays or packings known to the art.

Numeral 2 designates the feed inlet line to fractionating column 1. The feed stream, line 2, is a multi-component mixture which is to be fractionated in column 1 into a relatively lower boiling stream which is taken off as overhead product, and a relatively higher boiling stream which is taken off as bottoms product. The feed stream, line 2, is either liquid or vapor or a mixed liquid-vapor stream. The rate of flow of the feed stream, line 2, is controlled by rate of flow controller 3 which adjusts valve 4. In this manner the rate of flow of the feed stream can be maintained substantially constant. However, deviations will occur which are within the range of error in rate of flow controller 3. Flow controller 3 and valve 4 are both control devices known to the art and can be any conventional equipment capable of performing the functions designated. A vapor overhead stream is withdrawn from fractionating column 1 in line 5. Line 5 places the upper region of fractionating column 1 in communication with condenser 6. Condenser 6 may be any conventional condenser, either a shell and tube type condenser wherein a liquid is passed through the tubes to condense the vapor stream of line 5, or it may be an air-fin condenser wherein the vapor stream, line 5, passes through the tubes and air is circulated on the outer tube surface as the cooling medium.

In FIGURE 1, a coolant, such as water, flows through line 8 into condenser 6 and out through line 9. Rate of flow controller actuates valve 11 which controls the rate of flow of coolant in line 8. The condensate effluent from condenser 6 passes into line 7. A portion of the effluent in line 7 passes into line 12 through valve 13 to column 1 as reflux. Pressure controller 14 adjusts the rate of flow of reflux in line 12 by actuating valve 13. The overhead product, line 15, is passed through valve 16 and may be disposed of by any suitable means. The rate of flow of overhead product, line 15, is controlled by rate of flow controller 17 which actuates valve 16.

Bottoms product, line 18, is removed from the lower region of column 1 at a rate which is controlled by liquid level controller 19. Liquid level controller 19 actuates valve 20 to maintain a substantially constant liquid level in the bottom of column 1.

Heat is added to column 1 by means of reboiler 21. Reboiler 21 can be either the thermal-siphon type or one wherein a pump is required to remove liquid from the lower region of column 1. The liquid from the lower region of column 1 passes through line 22 to reboiler 21 wherein it is heated and partially or completely vaporized and passed back to column 1 through line 23. The rate of heat input is controlled by rate of flow controller 24 which actuates valve 25. A heating fluid such as steam passes through line 26 through valve 25 into reboiler 21 and out through line 27.

A sample of the feed stream, line 2, is withdrawn in line 28 and passed to analyzer 29. Analyzer 29 is any conventional continuous analyzer or even an extremely rapid discontinuous analyzer. Examples of such analyzers are infrared, ultraviolet, refractive index, chromatographic analysis, dielectric constant, as well as many other well known analyses methods. In the preferred embodiment of the present invention a discontinuous analyzer such as a chromatographic analyzer is used. Analyzer 29 determines the composition of the feed stream line 2. The signal generated in analyzer 29, either electric or pneumatic, passes to analog computer 30. A signal representative of the rate of flow of the feed stream, line 2, either electric or pneumatic, passes from rate of flow controller 3 to analog computer 30. Analog computer 30, which will be discussed in more detail in conjunction with FIGURE 2, continuously computes the quantity of overhead product to be withdrawn in line 15 and transmits a signal, either electric or pneumatic, to rate of flow controller 17 which actuates valve 16 to obtain the desired rate of flow of overhead product, line 15. Thus, analog computer 30 is used to reset rate of flow controller 17 to obtain the desired rate of overhead product, line 15.

Figure 2:
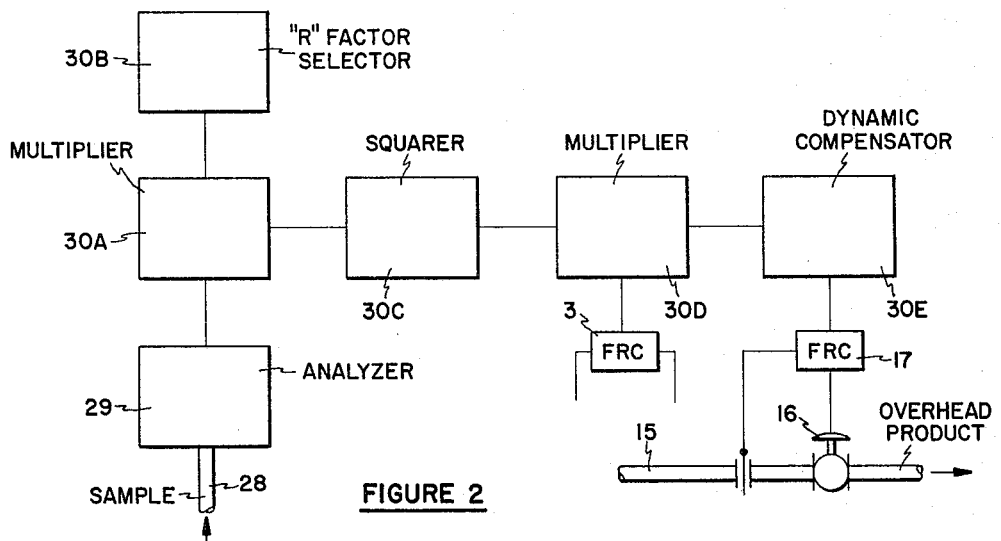
FIGURE 2 is a schematic representation of the analog computer which is used in the control system of the present invention.

FIGURE 2 represents an embodiment of the analog computer which is used in the control system of the present invention. Referring now to FIGURE 2, analyzer 29 passes to multiplier 30A, a signal, either electric or pneumatic, representative of the composition of the feed stream, line 2. The function of multiplier 30A is to obtain the fraction of the feed stream which is to be taken off as overhead product in line 15.

"R" factor selector 30B supplies to multiplier 30A a factor based on the design fractionation characteristics of column 1. The "R" factor is a fixed function for a specific fractionating column. In describing the "R" factor the light key is the heaviest component in the feed stream which is desired to be taken overhead. The heavy key is the lightest component in the feed stream which is desired to be taken off in the bottom product. It will be appreciated that a certain quantity of the heavy key will appear in the overhead product and a certain quantity of the light key will appear in the bottoms product. This is due to imperfect fractionation. A fractionating column is designed for a given number of theoretical stages and is meant to operate at a given internal reflux ratio. These two factors, as previously mentioned, set the fractionating characteristics of any column. With a given number of theoretical stages and at a given internal reflux ratio the fractionating column is designed for a given quantity of the heavy key to appear in the overhead product. This is generally the maximum quantity of the heavy key which can be tolerated in the overhead product consistent with the product quality desired. Deviations from this design case which result in an increase in the quantity of the heavy key in the overhead product, results in a product of impaired quality. On the other hand, if less than the design fraction of heavy key appears in the overhead product there is an unnecessary diminution in the quantity of the overhead prdouct. Thus, it is desirable to maintain the overhead product composition as constant as possible in view of the fractionating characteristics of the column.

The "R" factor is based on the fraction of the design feed stream which is taken off as overhead product. By design feed stream is meant the feed stream which the fractionating column was designed to process. "R" may be expressed as the ratio of the fraction of the light key in the design feed stream which is taken overhead, plus the fraction of the heavy key in the design feed stream is taken overhead, to the fraction of the light key in the design feed stream. Thus, suppose for example, the fraction of the light key in the design feed stream is 0.5. Suppose further that the fraction of the light key in the design feed stream which is taken overhead is 0.45. Suppose also that the fraction of the heavy key which is taken overhead in the design case is 0.05. Then "R" will equal 1.0. "R" generally falls in the range of from 0.9 to 1.1 for most fractionating columns.

Returning now to FIGURE 2, multiplier 30A multiplies the "R" factor times the fraction of the feed stream that is lighter than the heavy key. This signal which is representative of the fraction of the feed stream which is to be taken off as overhead product is passed to squarer 30C. Squarer 30C thus yields a signal which is representative of the square of the fraction of the feed stream in line 2 which is to be taken off as overhead product in line 15. The signal is passed to multiplier 30D. Multiplier 30D also receives a signal from rate of flow controller 3. Rate of flow controller 3 generates a signal which is a function of the square of the rate of flow of feed stream line 2. Thus in multiplier 30D a signal representative of the square of the feed rate times the square of the fraction of the feed stream which is to be taken off as overhead product in line 15 is obtained. This is passed to dynamic compensator 30E which, in turn, passes the signal on to rate of flow controller 17 which resets valve 16. The dynamic compensator corrects for the dynamic lags inherent in a large fractionating tower. It is used to program the signals sent to flow controller 17 so that they are correctly phased with the incoming feed disturbance. Thus the corrective action not only has the proper magnitude but it is applied at the correct time so as to maintain the overhead quality as constant as possible. A squared function is used to reset rate of flow controller 17 because conventional rate of flow controllers operate on a differential signal. That is, conventional rate of flow controllers utilize a difference in pressure to obtain a measurement of flow rate. It will be appreciated by those skilled in the art that this difference in pressure is a function of the square of flow rate. Thus, for convenience, rate of flow controller 17 is reset using a squared function. It is visualized, however, that a linear function could be used to reset rate of flow controller 17 using an adapter known to those skilled in the art to transpose the action to the squared function which is usable directly by the rate of flow controller 17.

Multiplier 30A is a commercially available instrument as designated by Foxboro type 46S-8-42.

"R" factor selector 30B is commercially available as Foxboro model 514F.

Squarer 30C is commercially available under Foxboro designation type 46S-11-42.

The dynamic compensator is a special device designed and built by the Foxboro Company for this control application.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

What is claimed is:

1. An apparatus for separating a fluid mixture of at least two components into two streams having different boiling points comprising a fractionating column, means to introduce the fluid mixture into said column, means to supply heat to said column, means to withdraw a bottoms product from said column, a condenser, means to pass vapor from the upper region of said column to said condenser, means to withdraw fluid from said condenser as condensed overhead product, means to pass a portion of said fluid from said condenser to said column as reflux, means to sense the pressure in said column, means responsive to said column pressure sensing means to control the rate of flow of said reflux, means for withdrawing a sample of said fluid mixture prior to introducing said mixture into said column, means to analyze said withdrawn sample to determine the composition of said fluid mixture to said column, means to measure the rate of flow of said fluid mixture to said column and means responsive to said analyzing means and said rate of flow measuring means to derive as an output signal a desired rate of flow of the condensed overhead product in accordance with a preselected relationship and means responsive to said output signal and separate from said reflux flow rate control means to adjust the rate of flow of said condensed overhead product.

2. An apparatus for continuously separating a multicomponent mixture into two streams of substantially constant quality by fractional distillation comprising a fractionating column, means to introduce said multicomponent mixture into said column, means to supply heat to said column, means to withdraw a bottoms product from the lower region of said column, means to withdraw a vapor stream from the upper region of said column, means to condense said withdrawn vapor stream, means to withdraw a portion of said condensed stream as overhead product, means to pass a portion of said condensed stream to said column as reflux, means to sense the pressure in said column, means responsive to said column pressure sensing means adjust the rate of flow of said reflux to maintain the pressure in said column at substantially a preselected level, means to analyze said multicomponent mixture to determine the composition of said mixture, means to measure the rate of flow of said multicomponent mixture to said column, a first means responsive to said analyzing means and said rate of flow measuring means to derive the fraction of said multicomponent mixture to be withdrawn as said overhead product, and a second means responsive to said first means to adjust the rate of flow of said overhead prdouct.

3. In a continuous fractional distillation process wherein a multicomponent mixture is separated into relatively higher boiling and relatively lower boiling fractions by flowing the mixture as feed into a fractionation distillation zone, withdrawing the higher boiling fraction from the lower region of the zone, adding heat to the lower region of the zone, withdrawing a vapor stream from the upper region of said zone, condensing the vapor stream, returning a portion of said condensed stream to the upper region of said zone as reflux and withdrawing a portion of said condensed stream as said relatively lower boiling fraction, an improved method for controlling the quality of said fractions comprising the steps of maintaining the pressure in the zone at substantially a preselected level by increasing the rate of flow of reflux as the pressure increases and decreasing the rate of flow of reflux as the pressure decreases, continuously deriving the rate of flow of the lower boiling fraction in the multicomponent feed mixture by continuously measuring the rate of flow of the multicomponent feed mixture and by continuously analyzing the composition of said multicomponent mixture, and continuously adjusting the rate of withdrawing said lower boiling fraction in response to the rate of flow of the lower boiling fraction in said multicomponent mixture.

4. The improved control method of claim 3 wherein the rate of withdrawal of said lower boiling fractions is controlled to give an overhead stream of substantially constant composition.

References Cited by the Examiner

UNITED STATES PATENTS

| 2,456,398 | 12/1948 | Gerhold | 202—160 |
| 2,881,235 | 4/1959 | Van Pool | 196—132 |
| 2,977,289 | 3/1961 | Kron | 202—40 |
| 2,985,565 | 5/1961 | Bellinger | 196—132 |
| 3,004,089 | 10/1961 | Hutto | 196—132 |

FOREIGN PATENTS 1,177,743  12/1958  France.

OTHER REFERENCES

Petroleum Refiner, J. F. Pink, March 1959, vol. 38, No. 3, pages 215–220.

NORMAN YUDKOFF, *Primary Examiner.*

WILBUR L. BASCOMB, JR., *Examiner.*